United States Patent [19]

Kim

[11] Patent Number: 5,191,437
[45] Date of Patent: Mar. 2, 1993

[54] DIGITAL IMAGE SIGNAL PLAYBACK CIRCUIT FOR COMBINING TWO CHANNEL PARALLEL PICTURE DATA INTO A SINGLE CHANNEL

[75] Inventor: Kye-Jong Kim, Kyunggi, Rep. of Korea

[73] Assignee: Samsung Electronics Co., Ltd., Kyunggi, Rep. of Korea

[21] Appl. No.: 712,746

[22] Filed: Jun. 10, 1991

[30] Foreign Application Priority Data

Jun. 27, 1990 [KR] Rep. of Korea ............... 90-9550[U]

[51] Int. Cl.$^5$ ............................................. H04N 5/95
[52] U.S. Cl. .................................... 358/337; 358/335; 360/22; 360/32
[58] Field of Search ............... 358/339, 335, 310, 337, 358/320, 323, 337; 360/32, 9.1, 10.3, 33.1, 36.2, 40, 47, 51, 64, 22, 23

[56] References Cited

U.S. PATENT DOCUMENTS

| | | | |
|---|---|---|---|
| 4,438,465 | 3/1984 | Moriya eet al. | 360/22 |
| 4,549,227 | 10/1985 | Hashimoto et al. | 360/32 |
| 4,625,230 | 11/1986 | Tan et al. | |
| 4,654,697 | 3/1987 | Sasson. | |
| 4,733,312 | 3/1988 | Morimoto. | |
| 4,811,123 | 3/1989 | Yoshinaka | 360/64 |
| 4,862,292 | 8/1989 | Enari et al. | 360/32 |
| 4,882,638 | 11/1989 | Onishi et al. | 360/32 |
| 4,914,527 | 4/1990 | Asai et al. | |
| 5,065,259 | 11/1991 | Kubota et al. | 358/335 |
| 5,068,752 | 11/1991 | Tanaka et al. | 358/339 |

FOREIGN PATENT DOCUMENTS

| | | |
|---|---|---|
| 3153307 | 12/1981 | Fed. Rep. of Germany. |
| 3121847 | 12/1982 | Fed. Rep. of Germany. |
| 56-51174 | 5/1981 | Japan ...................... 360/32 |

Primary Examiner—Tommy P. Chin
Assistant Examiner—Thai Tran
Attorney, Agent, or Firm—Cushman, Darby & Cushman

[57] ABSTRACT

A digital image signal playback circuit, the amount of hardware of which is greatly reduced. The circuit converts serial data transmitted in two channels into parallel data, corrects their time base errors by controlling how the parallel data is written into and read from memories, detects a synchronizing signal in the single channel output from the memories, and determines and outputs the original image signal from the single channel signal that may contain errors from the recording and playback operation.

7 Claims, 6 Drawing Sheets

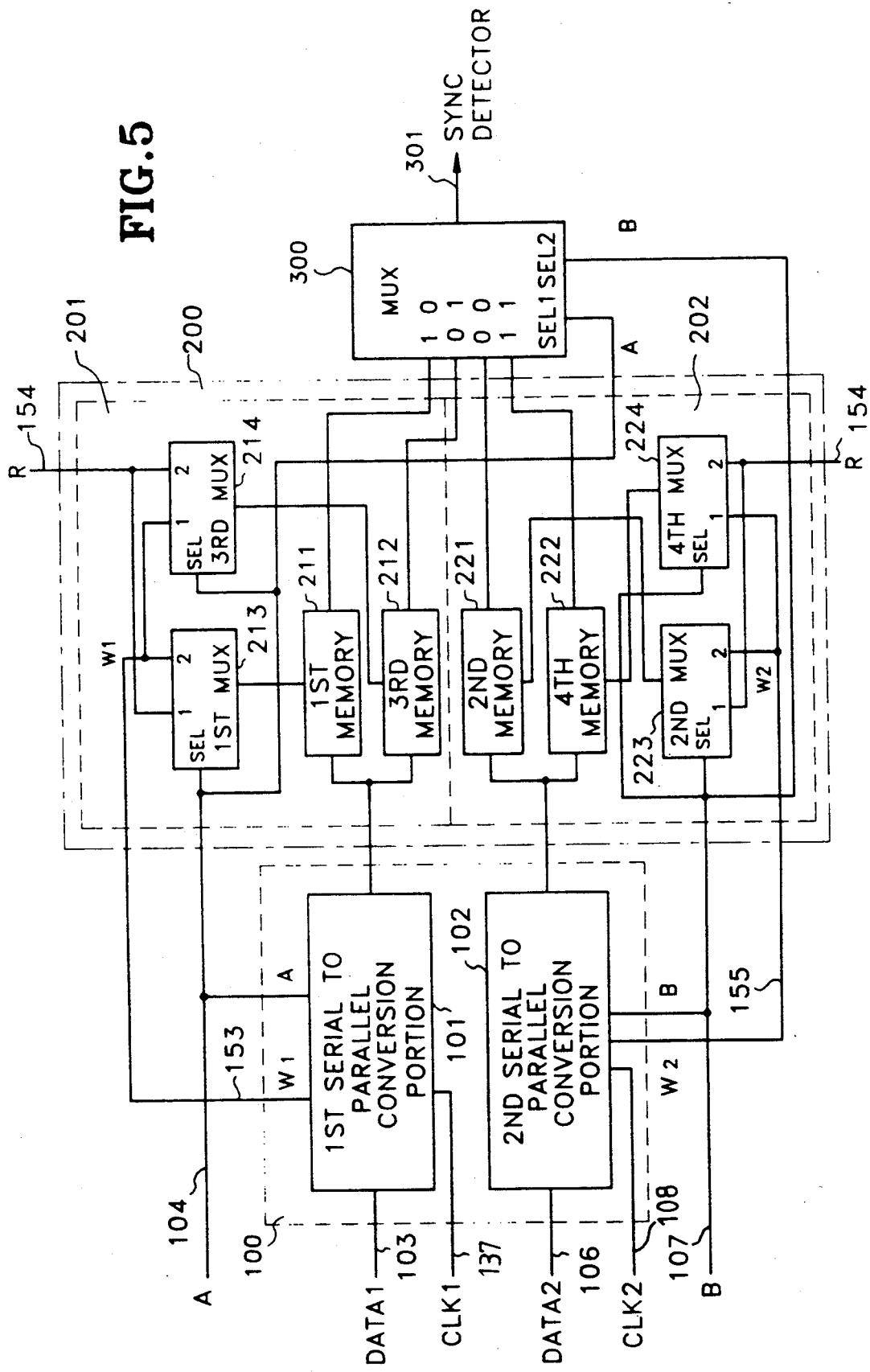

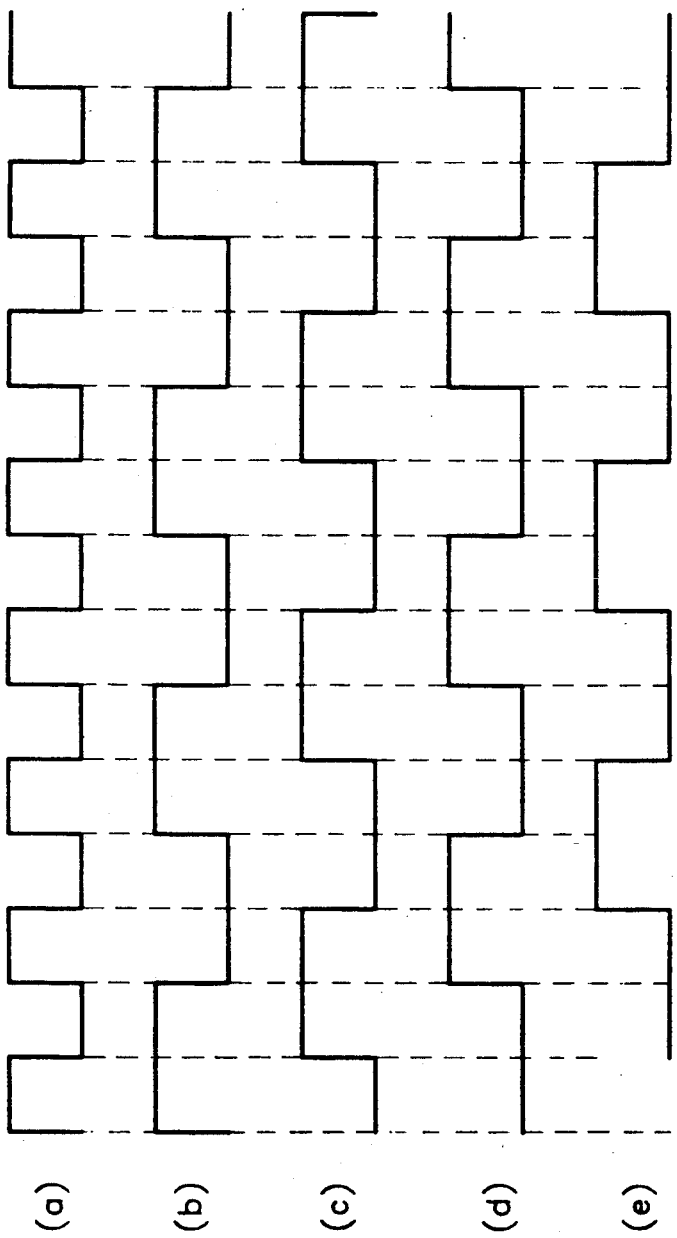

DIGITAL IMAGE SIGNAL PLAYBACK CIRCUIT FOR COMBINING TWO CHANNEL PARALLEL PICTURE DATA INTO A SINGLE CHANNEL

BACKGROUND OF THE INVENTION

1. Field of the Invention

The present invention relates to a digital image signal playback circuit in a digital image apparatus. More particularly, the invention relates to a digital image signal playback circuit which converts serial data, that is, image information transmitted in two channels of a digital image signal playback apparatus in a digital video tape recorder (hereinafter referred to as a VTR), into parallel data, corrects time base errors of the parallel data, and then reproduces the corrected data into a single channel.

2. Background Information

In a conventional digital image signal playback apparatus of a digital VTR, as shown in FIG. 1, serial data (image information) which is reproduced by a video tape head, inputted to the first and second channels I and II and then converted to parallel data in first and second serial-to-parallel conversion portions 1. First and second time base error correctors (hereinafter referred to as TBCs) in block 2 correct time base errors of the parallel data occurring during recording and reproducing. First and second sync detectors in block 3 detect a synchronizing signal included in the data outputted from the TBCs 2. The data outputted from the sync detectors 3 are supplied to first and second inner error correction decoders 4 which detect the original signal by means of parity data inserted in a symbol string of an error-created signal. The first and second correction decoders 4 then feed the signal into first and second deshuffling portions 5.

The deshuffling portions 5 write data from left to right, arranging the data from top to bottom in a matrix form, and read the data vertically to supply the data to multiplexer 6. Outer error correction decoder 7 then corrects the data errors which are transmitted by the multiplexer 6 to generate the error-corrected output data.

The conventional digital image signal playback circuit described above has a disadvantage, however, in that a large amount of hardware is required due to the complicated circuit construction of the sync detectors and inner error correction decoders which process a signal in two channels.

Another conventional digital playback circuit of a composite image signal is disclosed in Japanese patent laid-open publication No. 62-13195. This apparatus also has a disadvantage, however, in that a large mount of hardware is required since, after correcting a composite image signal input into a digital image signal output, the apparatus separates the digital signal into three chrominance signals R, G and B, and then records and reproduces them in three channels.

SUMMARY OF THE INVENTION

Therefore, it is an object of the present invention to provide a digital image signal playback circuit which has a simplified hardware construction. It an object of the present invention to convert serial data or image information inputted into two channels into parallel data, to correct time base errors of the parallel data, and then to reproduce the error-corrected data into a single channel.

To achieve the above object, the digital image signal playback circuit according to the present invention comprises:

first and second serial-to-parallel conversion portions for receiving serial data including head information inputted into respective channels, image information in which information produced in the unit of each pixel is coded and parity data for obtaining original image information by correcting errors created during reproducing, thereby converting the serial data to parallel data;

first and second time base correctors (TBCs) for correcting time base errors of a track having parallel data outputted from the first and second serial-to-parallel conversion portions by controlling write and read-out time of the parallel data;

a selector for transmitting data transmitted in two channels from the first and second TBCs into a single channel;

a sync detector for detecting a synchronizing signal from data outputted from the selector; and an inner error correction decoder for detecting the original image information by checking the parity data in a symbol string of an error-created signal outputted from the sync detector, thereby outputting the original image information.

BRIEF DESCRIPTION OF THE DRAWINGS

These and other advantages of the present invention will be more apparent after describing a preferred embodiment of the present invention with reference to the attached drawings, in which:

FIG. 5 is a circuit diagram illustrating a detailed construction of the TBC and selector in FIG. 2;

FIG. 6A is a waveform to explain operations of respective blocks illustrated in FIG. 5; and FIG. 6B illustrates the operating sequence of writing and reading of the memories in FIG. 5.

DETAILED DESCRIPTION OF THE INVENTION

A preferred embodiment of the present invention is described below with reference to the attached drawings.

Figure 1:
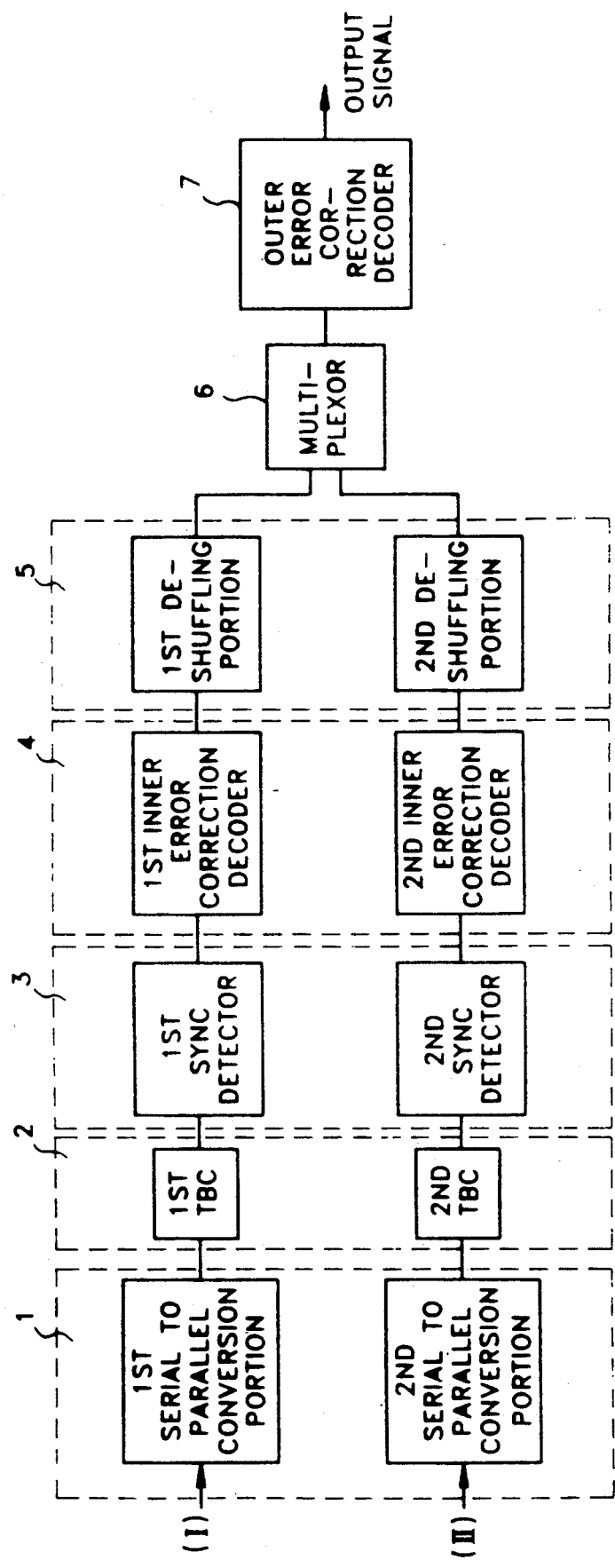
FIG. 1 is a block diagram of a conventional digital image signal playback circuit.
Figure 2:
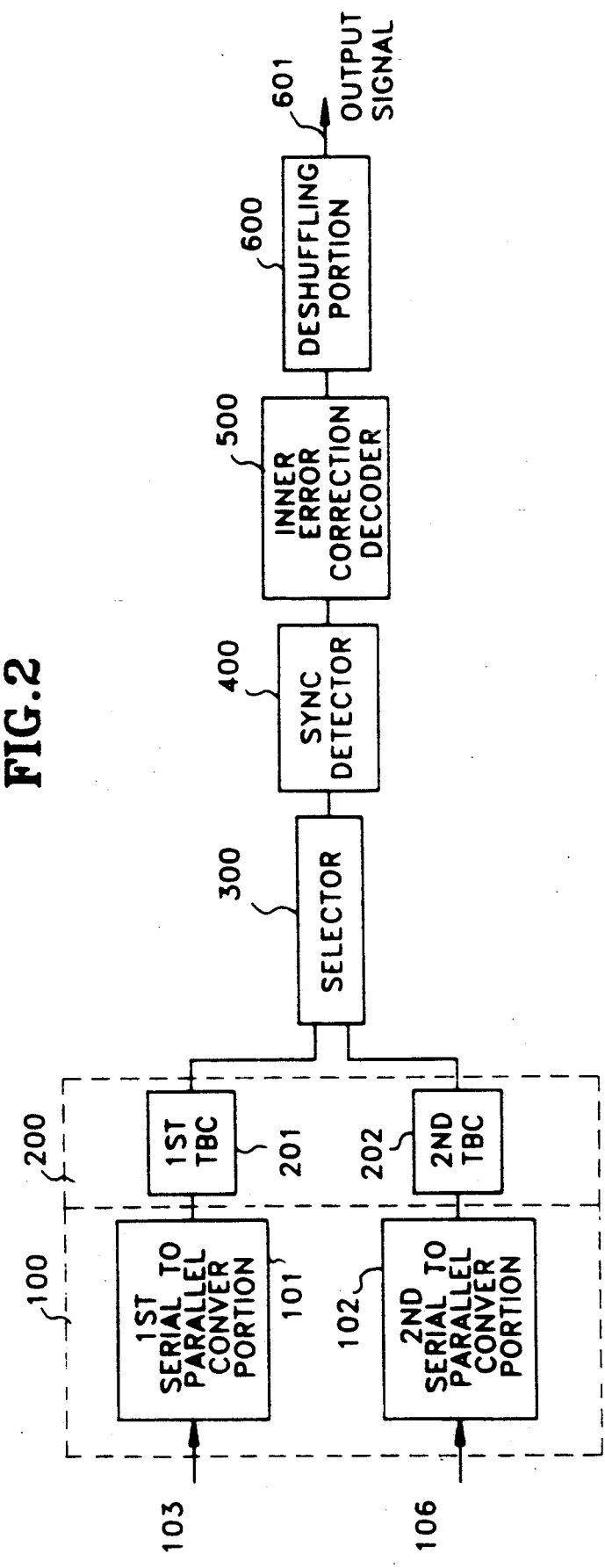
FIG. 2 is a block diagram of a digital image signal playback circuit according to the present invention.

FIG. 2 is a block diagram of a digital image signal playback circuit according to the present invention.

Referring to FIG. 2, input terminals 103 and 106 of the first and second serial-to-parallel conversion portions 100 are coupled to a component (not shown). This component which is not shown transmits serial data reproduced through a head (not shown) to two channels. Output terminals of the first and second serial-to-parallel conversion portions 100 are coupled to respective input terminals of the first and second TBCs 200. The first input terminal of selector 300 is coupled to the output terminal of the first TBC 201, the second input terminal is coupled to the output terminal of the second TBC 202, and the output terminal of selector 300 is coupled to the input terminal of sync detector 400.

The input terminal of inner error correction decoder 500 is coupled to the output terminal of the sync detector 400. The output terminal of the decoder 500 is coupled to the input terminal of deshuffling portion 600, and the output terminal 601 of the deshuffling portion 600 is coupled to the input terminal of an outer error correction decoder (not shown).

In operation, a head portion (not shown) consists of four heads A, B, C and D for reproducing information recorded in four tracks on a tape. This head portion reproduces a signal recorded by A and C heads in a first channel, and reproduces a signal recorded by B and D heads in a second channel. The first and second serial-to-parallel conversion portions 100 of the present invention convert this serial data of the two channels into N-bit parallel data. N is a natural number not less than 8. Serial data reproduced from such a head contains head information, video information coded in units of pixels, and parity data with which errors created during recording and playback are corrected to obtain the original image.

The first and second TBCs 200 then correct time base errors in the track by controlling the writing or reading operation of the parallel data output from the first and second serial-to-parallel conversion portions 100, into or from memories.

Selector 300 then selects the parallel data output from the first and second TBCs 200 alternately and outputs the selected data to sync detector 400.

The sync detector 400 detects a synchronizing signal inserted in the data of the channel selected by the selector 300. Data output from the selector 300 contains an error correction code (ECC), the synchronizing signals having been recorded in the two N-bit ECC code units.

Inner error correction decoder 500 demodulates the N-bit data output from the sync detector 400 into 8-bit data. The decoder 500 then detects the original signal from a symbol string of an error-created signal to feed the original signal into deshuffling portion 600. The reason for demodulating the N-bit data into 8-bit data at this time is that 8-bit information was originally modulated into N-bit information to record it on tape using a particular frequency band when recording.

Deshuffling portion 600 writes the data output from inner error correction decoder 500 from left to right, arranges it from top to bottom, and reads it vertically into an outer error correction decoder (not shown in FIG. 2).

A detailed description of the operation of the digital image signal playback circuit according to the present invention follows.

Figure 3:
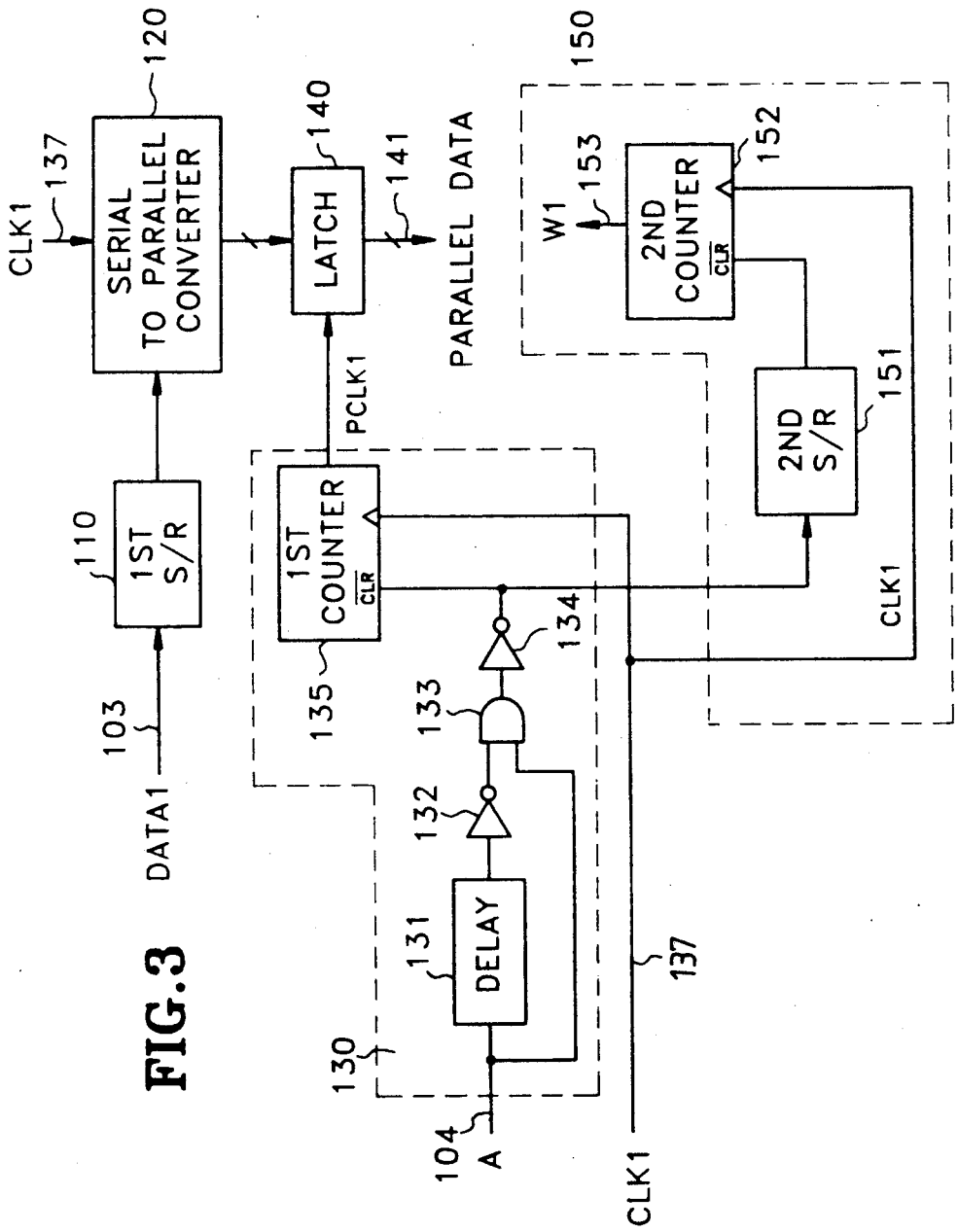
FIG. 3 is a circuit diagram illustrating a detailed construction of the first serial-to-parallel conversion portion of FIG. 2.

FIG. 3 is a detailed circuit diagram of the first serial-to-parallel conversion portion 101 adopted in FIG. 2.

In FIG. 3, the input terminal 103 of the first shift register 110 is connected to an output terminal (not shown) to receive serial data reproduced from head A. The output terminal of the shift register 110 is connected to the input terminal of serial-to-parallel conversion portion 120. The output terminal of the serial-to-parallel conversion portion 120 is connected to the input terminal of latch portion 140. A clock terminal of the serial-to-parallel conversion portion 120 is connected to the output terminal 137 of a clock generator (not shown) which generates a reproduction clock signal (CLK1).

The input terminal 104 of delay circuit 131 in frequency divider 130 is connected to a servo portion (not shown). This servo portion outputs a head switching signal indicative of whether a signal reproduced through the head is recorded on track A or on track B. The output terminal of the delay circuit 131 is connected to the input terminal of the first inverter 132. The first input terminal of AND gate 133 is connected to the output terminal of the inverter 132, and the second input terminal of the AND gate 133 is connected to the input terminal of delay circuit 131. The output terminal of the AND gate 133 is connected to the input terminal of the second inverter 134.

Clear terminal $\overline{CLR}$ of the first counter 135 is connected to the output terminal of the second inverter 134. The output terminal of the first counter 135 is connected to the clock input terminal of latch 140. The clock input terminal of first counter 135 is connected to the reproducing clock CLK1 terminal 137.

The output terminal 141 of latch 140 is connected to the first TBC 201 shown in FIG. 2.

The input terminal of the second shift register 151 in the write address generator 150 is also connected to the output terminal of the second inverter 134. The clock input terminal of the second counter 152 in the write address generator 150 is also connected to the reproducing clock output line 137. The output line W1 153 of the second counter 152 is connected to the first TBC 201 shown in FIG. 2.

Figure 4:
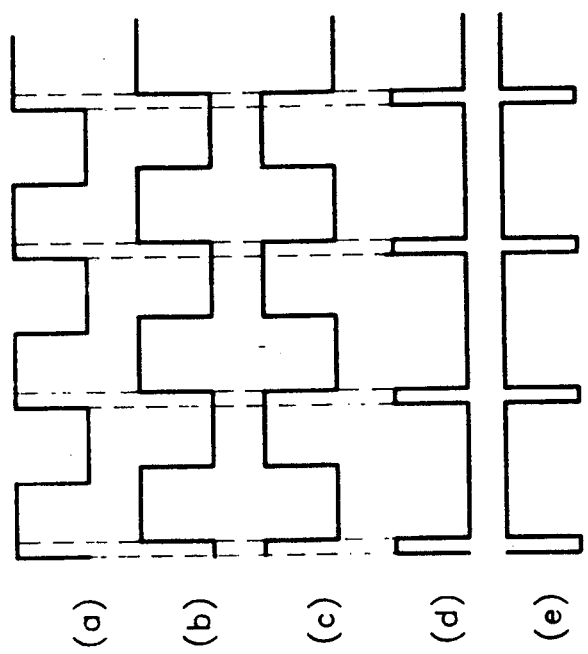
FIG. 4 is a waveform chart representing the operation of the frequency divider adopted in the first serial-to-parallel conversion portion of FIG. 3.

FIG. 4 shows operating waveforms of a frequency divider adopted in FIG. 3.

In FIG. 4, (a) shows a 60 Hz switching signal of head A inputted into delay circuit 131, (b) is an output waveform of delay circuit 131, (c) is an output waveform of the first inverter 132, (d) is an output waveform of AND gate 133, and (e) is an output waveform of the second inverter 134.

Sequentially, the operation of FIG. 3 will be described below with reference to the waveforms of FIG. 4.

Referring to FIG. 3, the first shift register 110 compensates the delay of serial data DATA1 so that parallel clock (PCLK1) from frequency divider 130 operates normally so that the output signal from latch 140 is outputted according to the PCLK1. Then, the compensated serial data DATA1 is supplied to serial-to-parallel converter 120.

Serial-to-parallel converter 120 converts the serial data outputted from the shift register 110 according to the reproducing clock CLK1 signal into 10-bit parallel data and supplies it to latch 140.

Meanwhile, if the switching signal of head A having such a waveform as waveform (a) in FIG. 4 is inputted into delay circuit 131, the switching signal of head A is delayed by an outputted clock pulse width signal having such a waveform as (b) in FIG. 4. The first inverter 132 inverts the output signal of the delay circuit 131 as waveform (b) in FIG. 4 into a signal having a waveform as (c) in FIG. 4 that is inputted to AND gate 133.

The AND gate 133 generates a signal having a waveform as (d) in FIG. 4, by logically multiplying the output of the first inverter 132 and switching signal of head A shown as (a) in FIG. 4 and outputs the signal into second inverter 134. The output of the second inverter 134 is depicted in waveform (e) in FIG.4, and is inputted to the clear terminal $\overline{CLR}$ of first counter 135.

The first counter 135 is cleared at a low condition of the output signal as waveform (e) of the inverter 134, and enabled at its high condition, counting a reproduced clock signal of 21.5 MHz. From this, the first counter 135 supplies a divide-by-10 parallel clock PCLK1 to latch portion 140. Latch 140 then latches 10-bit parallel data generated from serial-to-parallel converter 120 according to the PCLK1 outputted from the counter 135, and outputs the latched 10-bit parallel data to the first TBC 201 shown in FIG. 2.

The second shift register 151 of write address generator 150 for generating a clock signal used for a write address receives the output signal of inverter 134 (such as waveform (e) in FIG. 4) and compensates a delay time when the parallel data outputted from the latch 140 and write address signal W1 outputted from second counter 152 are synchronized, and then transmitted into the memories in the first TBC portion 201. A signal outputted from the second shift register 151 is inputted into the clear terminal $\overline{CLR}$ of the second counter 152 which generates write address signal W1 according to the reproducing clock signal CLK1. Second counter 152 then outputs this address signal W1 to the first TBC portion 201. The write address signal W1 is a divide-by-10 signal after frequency-dividing a 21.5 MHz reproducing clock.

FIG. 5 is a detailed circuit diagram of both TBC portions 200 and the selector 300 in FIG. 2. In FIG. 5, the input terminals of the first and third memories 211 and 212 of the first TBC portion 201 are connected to the output terminal 141 of latch 140 in FIG. 3. The output terminals of the memories 211 and 212 are connected to the first and second input terminals of selector 300, respectively.

The input terminals of the second and fourth memories 221 and 222 of the second TBC portion 202 are connected to the output terminal of a latch whose structure and operation are identical with the latch 140 of the first channel, and the output terminals are connected to the third and fourth input terminals of selector 300, respectively. The first serial-to-parallel conversion portion 101, selecting terminals SEL of the first and third multiplexers 213 and 214, and the first selecting terminal SEL1 of selector 300 constructed as a multiplexer are all connected via line 104 to a head switching signal output terminal (not shown) of head A or C in the servo portion for revolving a drum. The serial data DATA1 and the reproducing clock CLK1 are inputted to the first serial-to-parallel conversion portion 101 via line 103 and line 137, respectively.

The second serial-to-parallel conversion portion 102, selecting terminals SEL of the second and fourth multiplexers 223 and 224, and the second selecting terminal SEL2 of selector 300 are connected via line 107 to a head switching signal output terminal of head B or D (not shown) in the servo portion. The serial data DATA2 and the reproducing clock CLK2 are inputted to the second serial-to-parallel conversion portion 102 via line 106 and line 108, respectively.

The second input terminal 2 of the first multiplexer 213 and the first input terminal 1 of the third multiplexer 214 are connected to the output terminal of the second counter 152 shown in FIG. 3. The write address generator of the second channel is identical with the write address generator 150 of the first channel in its structure and operation, and the output terminal of the second counter of the second channel is connected to the second input terminal 2 of the second multiplexer 223 and the first input terminal 1 of the fourth multiplexer 224. A clock generator (not shown) for generating a reference clock signal for driving a drum has an output terminal 154 for outputting a read address clock signal R. This signal R is used in both the first and second channels, being commonly connected to the first input terminal 1 of the first multiplexer 213, the second input terminal 2 of the third multiplexer 214, the first input terminal 1 of the second multiplexer 223, and the second input terminal 2 of the fourth multiplexer 224.

The output terminal of the first multiplexer 213 is connected to a write/read control terminal of the first memory 211, and the output terminal of the third multiplexer 214 is connected to a write/read control terminal of the third memory 212. The output terminal of the second multiplexer 223 is connected to a write/read control terminal of the second memory, and the output terminal of the fourth multiplexer 224 is connected to a write/read control terminal of the fourth memory 222.

FIG. 6A shows waveforms of signals inputted to the serial-to-parallel conversion portions and TBCs utilized in FIG. 5.

Referring to FIG. 6A, waveform (a) is a 120 Hz control signal generated when revolving a drum, compared with a reference signal fed into the servo portion (not shown). The head switching signal of head A shown in waveform (b) determines whether a reproduced signal is recorded on track A or C when a head is changed in the first channel. The head switching signal of head B shown in waveform (c) determines whether a reproduced signal is recorded on track B or D when a head is changed in the second channel. The head switching signal of head C shown in waveform (d) is an inverted signal of the head switching signal of head A, and the head switching signal of head D shown in waveform (e) is an inverted signal of the head switching signal of head B.

FIG. 6B illustrates the operation sequence of writing/reading data in memories utilized in the TBC portion. The operation of FIG. 5 is described below with reference to FIGS. 6A and 6B.

In FIG. 5, the head switching signal of head A in the first channel is inputted into serial-to-parallel conversion portion 101 of the first channel, selecting terminal SEL of the first and third multiplexers 213 and 214, and the first selecting terminal SEL1 of selector 300.

The head switching signal of head B in the second channel is inputted into serial-to-parallel conversion portion 102 of the second channel, selecting terminal SEL of the second and fourth multiplexers 223 and 224, and the second selecting terminal SEL2 of selector 300.

Write address signal W1 for writing data of the first channel to the first and third memories 211 and 212 is inputted to the second input terminal 2 of the first multiplexer 213 and the first input terminal 1 of the third multiplexer 214. Read address signal R for reproducing data of the first channel, commonly used in both the first and second channels, is inputted to the first input terminal 1 of the first multiplexer 213 and the second input terminal 2 of the third multiplexer 214.

Write address signal W2 for writing data of the second channel in the second and fourth memories 221 and 222 is inputted to the second input terminal 2 of the second multiplexer 223 and the first input terminal 1 of the fourth multiplexer 224. Read address signal R for reproducing data of the second channel, commonly used in both the first and second channels, is inputted to the first input terminal 1 of the second multiplexer 223 and the second input terminal 2 of the fourth multiplexer 224.

At this time, if a picture area is divided into four regions, image information in the left upper region (the first region) is recorded on track A and image information in the right upper region (the third region) is recorded on track C. This image information is then reproduced by heads A and C and supplied into the first and third memories 211 and 212 of the first channel. Likewise image information in the left lower region (the second region) is recorded on track B and image information in the right lower region (the fourth region) is recorded on track D. This recorded image information is then reproduced by heads B and D and supplied to the second and fourth memories 221 and 222 of the second channel. The first to fourth multiplexers 213, 214, 223 and 224 select the first input terminal 1 when a head switching signal inputted into selecting terminal SEL is "low(L)", and select the second input terminal 2 when the head switching signal is "high(H)".

Therefore, depending on the output of the first multiplexer 213, the first memory 211 may either write the data outputted from the first serial-to-parallel conversion portion 101 or may read out the data stored in the first memory 211 to the first input terminal "10" of multiplexer 300, when head switching signal A of selector 300 is "low(L)" and head switching signal B is "high(H)". Depending on the output of the third multiplexer 214, the third memory 212 may either write the data outputted from the first serial-to-parallel conversion portion 101 or may read out the data of the third memory 212 to the second input terminal "01" of multiplexer 300, when head switching signal A of selector 300 is "high(H)"and head switching signal B is "low(L)".

Depending on the output of the second multiplexer 223, the second memory 221 may either write the data outputted from the second serial-to-parallel conversion portion 102 or may read out the data stored in the second memory 221 into the third input terminal "00" of multiplexer 300, when head switching signals A and B of selector 300 are "low(L)". Depending on the output of the fourth multiplexer 224, the fourth memory 222 may either write data outputted from the second serial-to-parallel conversion portion 102 or may read out the data stored in the fourth memory 222 to the fourth input terminal "11" of multiplexer 300, when head switching signals A and B of selector 300 are "high(H)". If head switching signal A of the first channel is "high(H)" and head switching signal B of the second channel is "low(L)", the first multiplexer 213 selects write address signal W1 of the first channel and then writes the data outputted from the first serial-to-parallel conversion portion 101 of the first channel into the first memory 211. Simultaneously, the third multiplexer 214 selects read address signal R, commonly used in both the first and second channels, and then reads out the data stored in the third memory 212 after being transmitted from the serial-to-parallel conversion portion 101 of the first channel.

The second multiplexer 223 selects read address signal R, commonly used in both the first and second channels, and then reads out the data stored in the second memory 221 after being transmitted from the serial-to-parallel conversion portion 102 of the second channel. Simultaneously, the fourth multiplexer 224 selects write address signal W2 of the second channel and writes the data outputted from the serial-to-parallel conversion portion 102 of the second channel into the fourth memory 222. At this time, selector 300 outputs only the data read out from the third memory 212.

As shown in FIGS. 6A and 6B, data is written into first memory 211 during a period when head switching signal A is "high(H)". Data is read out from first memory 211 during the period from the falling edge of head switching signal A to the falling edge of head switching signal B.

Thus, according to the logic states of head switching signals A, B, C and D, selector 300 controls the read-out of the first to fourth memories, thereby outputting image information corresponding to the respective divided picture regions. The writing period of data therefore becomes different from the reading period. The reproducing clock for reproducing the data recorded on a tape is frequency-divided by 10 to generate a write address signal when writing. The reference clock generated from a clock generator provided to the servo portion, on the other hand, is used as a readout address signal which has a frequency two times higher than the divide-by-10 write address clock.

The digital image signal playback circuit of the present invention as described above in detail has an advantage in that the amount of hardware is greatly reduced through a playback process which converts serial data transmitted in two channels into parallel data, corrects their time base errors by controlling the write and read-out time of the parallel data, detects a synchronizing signal in a single channel by a selection means and detects an original signal from an error-created signal.

What is claimed is:

1. A digital image signal playback circuit having information stored thereon and comprising:

first and second serial-to-parallel conversion means, coupled to a first and second channel respectively, for receiving respective first and second serial strings of digital data representative of a portion of said stored information, each string comprising head indicator information and serial data information, said serial data information including image data information and parity data information, said first and second serial-to-parallel conversion means converting said first and second serial strings to first and second parallel data respectively;

first and second time base corrector means for correcting time base errors in the transmitted parallel data by controlling the reading and writing transmission operation of the first and second parallel data from the first and second serial-to-parallel conversion means respectively coupled thereto, and outputting first and second time-corrected output data streams respectively;

selector means for combining said first and second time-corrected output data streams into a single channel data stream;

sync detector means for detecting synchronizing signals recorded in said single channel data stream and outputting symbol string information including parity data; and inner error correction decoder means for generating original image information in response to the parity data in said symbol string information, wherein each of of said first and second serial-to-parallel conversion means comprises:

a clock generator, responsive to a recording clock, for generating a clock signal having a frequency related to the period of the head indicator information;

a converter circuit for converting the respectively input serial string to parallel data having a predetermined number of bits, said converter circuit being clocked in response to said recording clock;

means for latching the parallel data from said circuit converter in response to said clock signal; and means for generating a write address clock signal for writing said parallel data from said latching means into said respective one of said first and second time base corrector means in response to the head indicator information.

2. A digital image signal playback circuit having information stored thereon and comprising:

first and second serial-to-parallel conversion means, coupled to a first and second channel respectively, for receiving respective first and second serial strings of digital data representative of a portion of said stored information, each string comprising head indicator information and serial data information, said serial data information including image data information and parity data information, said first and second serial-to-parallel conversion means converting said first and second serial strings to first and second parallel data respectively;

first and second time base corrector means for correcting time base errors in the transmitted parallel data by controlling the reading and writing transmission operation of the first and second parallel data from the first and second serial-to-parallel conversion means respectively coupled thereto, and outputting first and second time-corrected output data streams respectively;

selector means for combining said first and second time-corrected output data streams into a single channel data stream;

sync detector means for detecting synchronizing signals recorded in said single channel data stream and outputting symbol string information including parity data; and inner error correction decoder means for generating original image information in response to the parity data in said symbol string information, wherein each of said first and second time base corrector means comprises:

first and second memory means for storing the parallel data outputted from the corresponding one of said first and second serial-to-parallel conversion means, each of said first and second memory means corresponding to respective first and second picture regions of a picture defined by the original image information; and first and second multiplexer means, each for selecting one of a write address clock outputted from said corresponding serial-to-parallel conversion means and a read-out address clock outputted from an outer clock generator, said outer clock generator generating said read-out address clock in response to head information signals associated therewith, each of said first and second multiplexer means for outputting a control signal which controls reading and writing to and from a respective one of said first and second memory means.

3. A digital image signal playback circuit as claimed in claim 2, wherein each of said first and second memory means includes an output terminal, and wherein said selector means selects a respective one of the output terminals of the first and second memory means of either one of the first and second time base corrector means in response to head information signals associated with both first and second serial strings.

4. A digital image signal playback circuit as claimed in claim 3, wherein the head information signals associated with said first serial string have a 90° phase difference with the head information signals associated with the second serial string.

5. A digital image signal playback circuit as claimed in claim 2, wherein said read-out address clock has a frequency higher, by a certain multiple, than said write address clock.

6. A digital image signal playback circuit as claimed in claim 2, wherein parallel data of the first and second picture regions are supplied to the first and second memory means respectively of said first time base corrector means, and wherein parallel data of third and fourth picture regions of the picture defined by the original image information are supplied to the corresponding first and second memory means of said second time base corrector means respectively.

7. A digital image signal playback circuit as claimed in claim 6, wherein said first picture region corresponds to a left upper region of the picture defined by the original image information, said second picture region corresponds to a right upper region of the picture, said third picture region corresponds to a left lower region of the picture, and said fourth picture region corresponds to a right lower region of the picture.

* * * * *